(12) United States Patent
Durfee (10) Patent No.: US 8,733,189 B2
(45) Date of Patent: May 27, 2014

(54) COMBINATION TRANSMISSION SELECTOR AND SPEED SENSOR

(75) Inventor: Anthony Lewis Durfee, Jackson, TN (US)

(73) Assignee: EMZ-Hanauer GmbH & Co KGAA, Nabburg (DE)

( * ) Notice: Subject to any disclaimer, the term of this patent is extended or adjusted under 35 U.S.C. 154(b) by 761 days.

(21) Appl. No.: 12/966,013

(22) Filed: Dec. 13, 2010

(65) Prior Publication Data

US 2011/0138953 A1    Jun. 16, 2011

Related U.S. Application Data

(60) Provisional application No. 61/285,613, filed on Dec. 11, 2009.

(51) Int. Cl.
*F16H 21/10* (2006.01)

(52) U.S. Cl.
USPC ............................................. 74/1 R; 318/807

(58) Field of Classification Search
USPC ............................................. 318/807; 74/1 R
See application file for complete search history.

(56) References Cited

U.S. PATENT DOCUMENTS

| | | | | |
|---|---|---|---|---|
| 4,857,814 A * | 8/1989 | Duncan | | 318/281 |
| 5,576,620 A | 11/1996 | Cheong | | |
| 5,677,606 A * | 10/1997 | Otake | | 318/434 |
| 5,875,783 A * | 3/1999 | Kullik | | 128/204.18 |
| 5,970,555 A * | 10/1999 | Baek et al. | | 8/159 |
| 6,282,965 B1 * | 9/2001 | French et al. | | 73/660 |
| 6,332,343 B1 | 12/2001 | Kosketsu et al. | | |
| 6,381,791 B1 * | 5/2002 | French et al. | | 8/159 |
| 6,609,264 B2 * | 8/2003 | Ruhl et al. | | 8/158 |
| 6,834,407 B2 * | 12/2004 | Stephens | | 8/158 |
| 7,060,979 B2 | 6/2006 | Manz et al. | | |
| 7,082,792 B2 * | 8/2006 | Ahn | | 68/12.24 |
| 7,086,254 B2 | 8/2006 | Lim et al. | | |
| 7,230,394 B2 | 6/2007 | Sa et al. | | |
| 7,418,841 B2 * | 9/2008 | Yoon et al. | | 68/12.24 |
| 7,621,158 B2 * | 11/2009 | Roepke et al. | | 68/132 |
| 7,841,218 B2 * | 11/2010 | Dominguez et al. | | 68/12.24 |
| 7,904,984 B2 * | 3/2011 | Koo et al. | | 8/158 |
| 2002/0050011 A1 * | 5/2002 | Cho et al. | | 8/159 |
| 2004/0189243 A1 * | 9/2004 | Tobari et al. | | 318/807 |
| 2005/0086743 A1 * | 4/2005 | Kim et al. | | 8/158 |
| 2005/0097680 A1 * | 5/2005 | Kim et al. | | 8/158 |

* cited by examiner

*Primary Examiner* — David M Fenstermacher
(74) *Attorney, Agent, or Firm* — Cooper Legal Group, LLC (57) ABSTRACT

A combination module for an appliance includes a transmission selector mechanism adapted to selectively operate transmission shift structure of the appliance, and a speed sensor mechanism adapted to sense the operative speed of a motive element of the appliance. In one example, the combination module further includes a single electrical connector adapted to electrically couple the transmission selector mechanism and the speed sensor mechanism to control circuitry of the appliance.

21 Claims, 7 Drawing Sheets

COMBINATION TRANSMISSION SELECTOR AND SPEED SENSOR

RELATED APPLICATIONS

This application claims the benefit of U.S. Provisional Application No. 61/285,613, filed on Dec. 11, 2009, the entire disclosure of which is hereby incorporated herein by reference.

FIELD OF THE INVENTION

The present application relates generally to a combination transmission selector and speed sensor for use in appliances and the like.

BACKGROUND OF THE INVENTION

In conventional appliances, such as washing machines, the washing action is achieved by oscillation of an agitator disposed within a washing machine basket that contains the clothing items to be washed and fluid for washing the clothes. After each wash and rinse agitation step in the cycle, the liquid is extracted by a high speed rotation of the basket. Current washing machine designs utilize a transmission having shift structure which can be operated to selectively condition the drive element to supply oscillatory motion to the agitator, or to supply high-speed or low-speed rotational motion to the wash basket.

Additionally, for performance or safety reasons, it is often desirable to monitor the actual speed of rotation of the wash basket. For example, during the wash or rinse cycles, it may be important to know whether the wash basket is creeping or spinning. In some cases, whether in the wash or rinse cycle, or in the spin cycle, when the wash basket is rotating or spinning above a certain speed, it may be desirable to lock the lid closed to prevent someone from sticking their hands into the area of the wash basket. The speed may also be monitored to determine that the brake has failed, such as where the motor has been deenergized for some time, but the speed sensor continues to indicate that the wash basket is rotating too fast.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is, presented later.

In accordance with one aspect of the present invention, a combination module for an appliance includes a main body adapted to be coupled to the appliance. A transmission selector mechanism is coupled to the main body and adapted to selectively operate transmission shift structure of the appliance. A speed sensor mechanism is coupled to the main body and adapted to sense the operative speed of a motive element of the appliance.

In accordance with another aspect of the present invention, a combination module for an appliance includes a transmission selector mechanism adapted to selectively operate transmission shift structure of the appliance. A speed sensor mechanism is adapted to sense the operative speed of a rotating element of the appliance. A single electrical connector is adapted to electrically couple the transmission selector mechanism and the speed sensor mechanism to control circuitry of the appliance.

In accordance with another aspect of the present invention, a combination module for an appliance includes a transmission selector mechanism including a transmission selector arm adapted to selectively operate transmission shift structure of the appliance between a first state and a second state. An indicator element is operatively driven by the transmission selector arm and adapted to indicate whether the transmission shift structure of the appliance is in the first state or the second state. A speed sensor mechanism is adapted to sense the operative speed of a motive element of the appliance.

It is to be understood that both the foregoing general description and the following detailed description present example and explanatory embodiments of the invention, and are intended to provide an overview or framework for understanding the nature and character of the invention as it is claimed. The accompanying drawings are included to provide a further understanding of the invention and are incorporated into and constitute a part of this specification. The drawings illustrate various example embodiments of the invention, and together with the description, serve to explain the principles and operations of the invention.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

An example embodiment of a device that incorporates aspects of the present invention is shown in the drawings. It is to be appreciated that the shown example is not intended to be a limitation on the present invention. For example, one or more aspects of the present invention can be utilized in other embodiments and even other types of devices.

Figure 1:
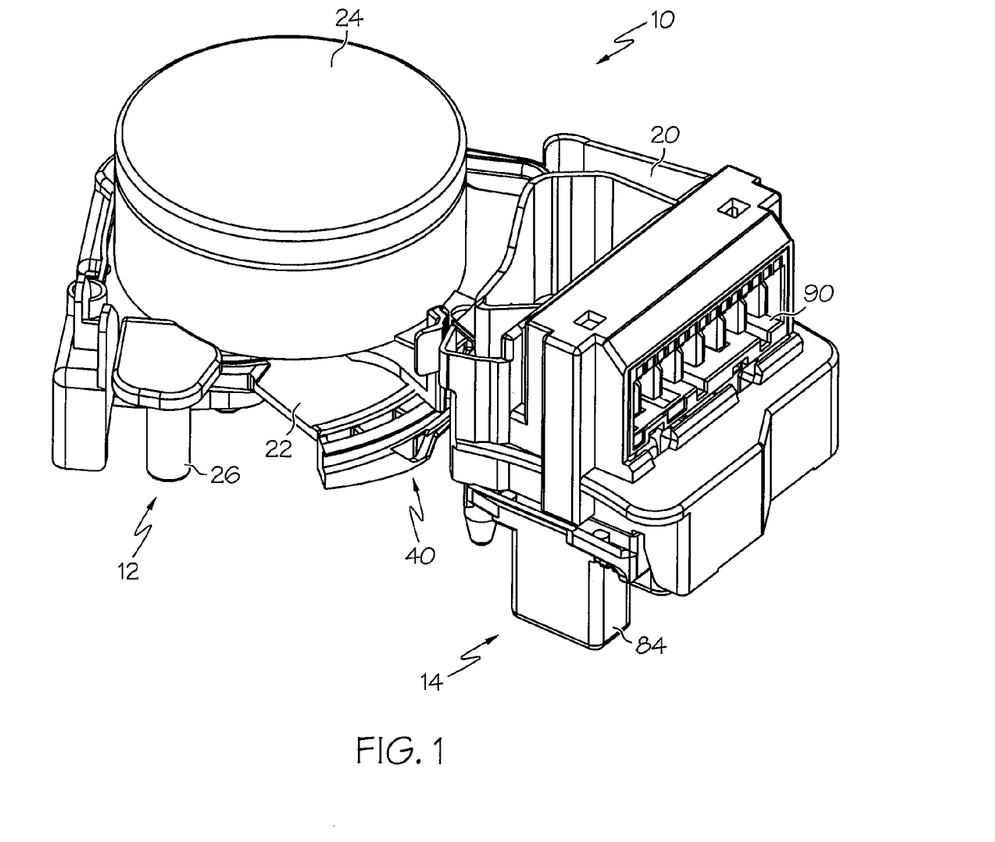
FIG. 1 illustrates a top perspective view of an example combination module.

Turning to the shown example of FIG. 1, a combination module 10 is illustrated for use in appliances and the like. The combination module 10 can be used in various applications, such as in various home and/or industrial appliances. For example, the combination module 10 will be described herein for use in a clothes washing machine, such as a top-load washing machine, though it is to be understood that it can be used in various other appliances and/or devices that include a transmission and a speed sensor.

The combination module 10 generally includes a transmission selector mechanism 12 adapted to selectively operate transmission shift structure 16 (see FIG. 4) of the appliance, and a speed sensor mechanism 14 adapted to sense the operative speed of a motive element 18 (see FIG. 7) of the appliance. Thus, a single part can replace two or more conventional parts while providing similar functionality.

The combination module 10 (FIG. 1) includes a generally rigid main body 20 formed of one or more materials, such as a unitary body formed of plastic, metal, hard rubber or the like. In a washing machine environment, it can be beneficial to utilize materials that are generally unaffected by water and/or detergents. The main body 20 is adapted to be coupled to a portion of the appliance via various mechanical fasteners, such as screws, bolts, etc. The main body 20 provides a single mounting system for both of the transmission selector mechanism 12 and the speed sensor mechanism 14. Additionally, the main body 20 can include various structure(s) for coupling the various elements of the transmission selector mechanism 12 and/or speed sensor mechanism 14 thereto.

Figure 2:
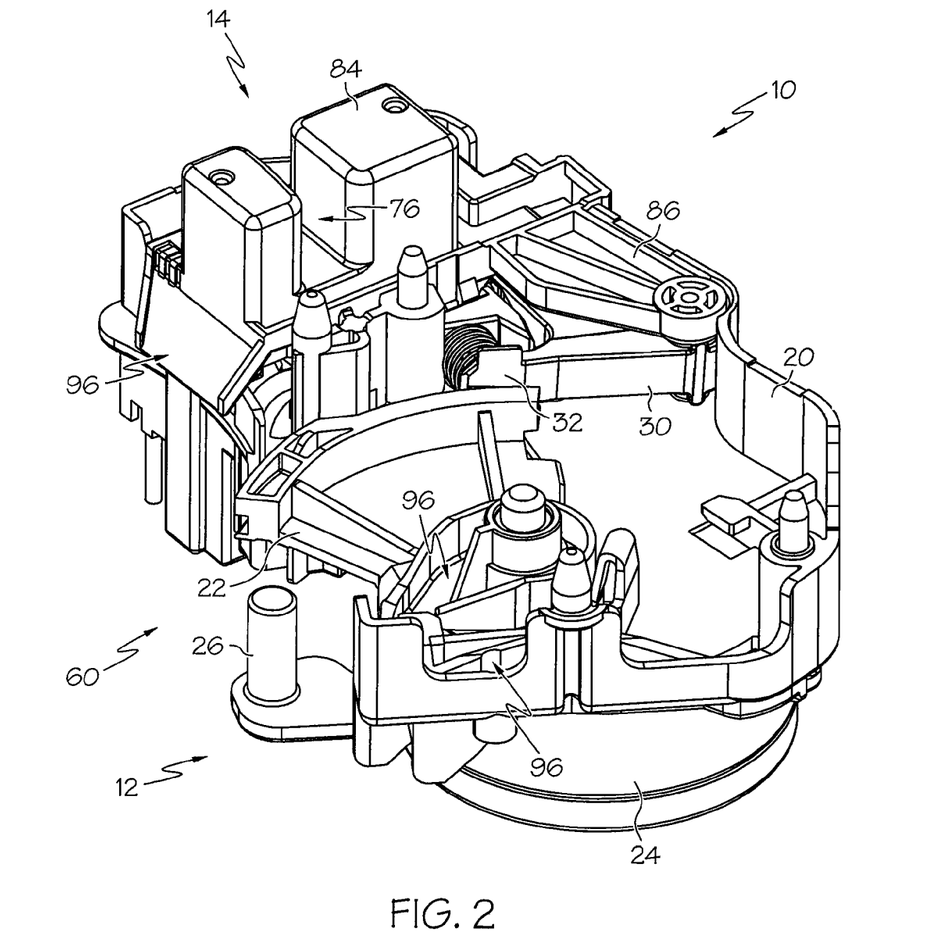
FIG. 2 illustrates a bottom perspective view of the example combination module.

The transmission selector mechanism 12 is coupled to the main body 20 and is adapted to selectively operate transmission shift structure 16 (see FIG. 4) of the transmission of the washing machine to selectively condition a wash basket drive element (e.g., motor) to supply oscillatory motion or rotational motion to the agitator and/or wash basket. The transmission selector mechanism 12 includes a transmission selector arm 22 that is operatively driven by an electric motor 24 (FIG. 2), such as an AC synchronous motor, though various other types of motors (e.g., AC or DC, hydraulic, pneumatic, etc.) can also be used. The electric motor 24 can be coupled to one side of the main body 20, and an output shaft (not shown) thereof can extend through the main body 20 for engagement with the transmission selector arm 22 (see FIG. 2). The output of the electric motor 24 can drive, directly or indirectly through one or more gears, the transmission selector arm 22 to selectively operate the transmission shift structure 16 between a first state and a second state, such as to adjust the drive element between supplying oscillatory or rotational motion. The transmission selector arm 22 can include suitable structure for direct or indirect engagement with the transmission shift structure 16. In one example, the transmission selector arm 22 can include an offset pin 26 adapted to engage a hook 28 (see FIG. 4) or the like of the transmission shift structure 16.

Though described as selecting between two transmission states (i.e., first and second states), the transmission selector mechanism 12 can be adapted to selectively operate the transmission shift structure 16 among various transmission states. For example, the transmission selector mechanism 12 can provide a neutral or delay position, such as for delaying the initiation of the wash basket spin during a water drain-down cycle or the like. In addition or alternatively, the delay can be provided by an electrical control or the like. In addition or alternatively, the transmission selector mechanism 12 can be adapted to operate together with one or more clutches interposed between any of the transmission, drive element, agitator and/or wash basket.

Figure 3:
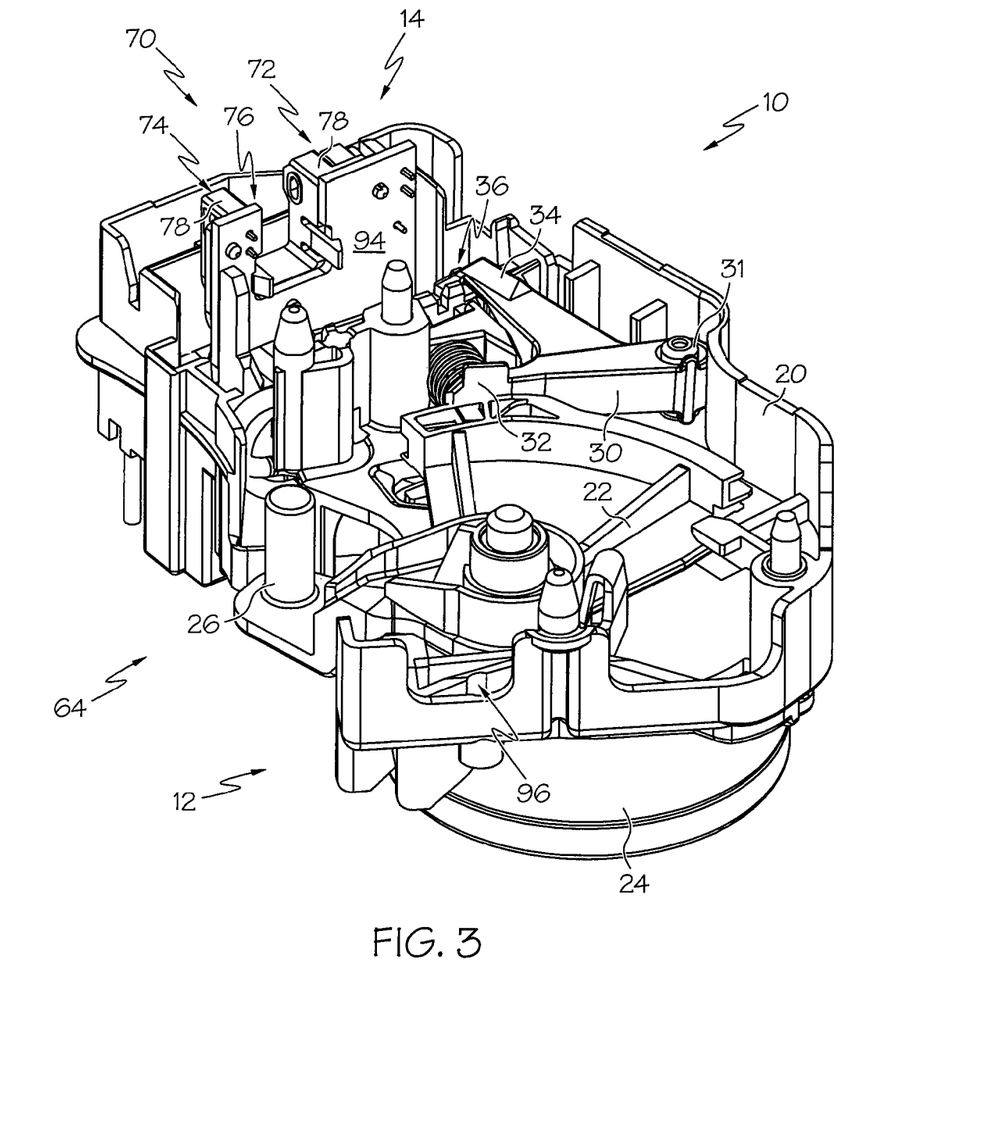
FIG. 3 is an illustration similar to FIG. 2, but with a protective cover removed.
Figure 4:
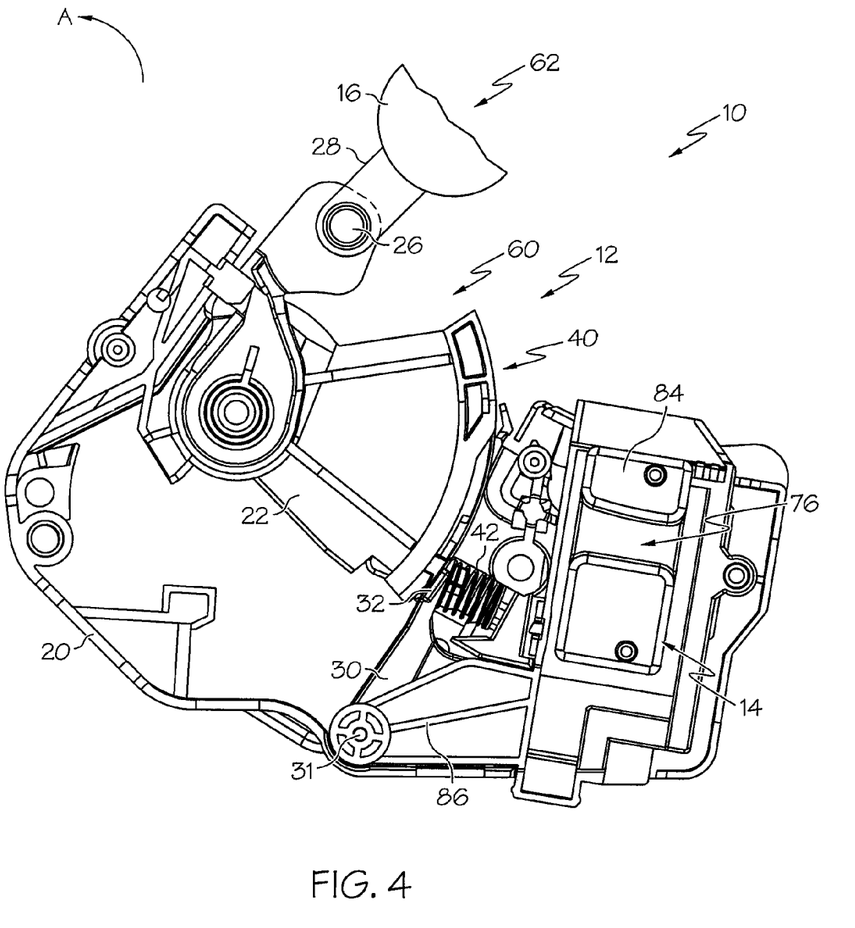
FIG. 4 illustrates a top view of the example combination module with an example transmission selector arm in a first position.

Turning to FIGS. 3-4, the transmission selector mechanism 12 can further include an indicator element 30 operatively driven by the transmission selector arm 22 to provide an indication of which transmission state is currently active (i.e., whether the transmission shift structure 16 is in the first state, second state, delay state, etc.). In one example, the indicator element 30 can be operatively driven by a cam surface 40 of the transmission selector arm 22, and can be further adapted to engage a switch 36 (see FIG. 3) based upon a position of the indicator element 30. For example, the indicator element 30 can be driven by the cam surface 40 to move along a linear path, a curved path, etc. In another example, the indicator element 30 can include a pivot arm movable about a pivot point 31 and having a first end 32 operatively driven by the cam surface 40 of the transmission selector arm 22, and a second end 34 adapted to engage the switch 36 based upon a position of the first end 32. The indicator element 30 can be resiliently biased, such as by a spring 42 or the like, generally towards the cam surface 40 of the transmission selector arm 22. The resilient biasing of the spring 42 can help maintain engagement of the first end 32 with the cam surface 40, and/or bias the second end 32 away from engaging the switch 36.

The second end 34 of the pivot arm can be adapted to engage the switch 36 based upon a position of the pivot arm. Different types of switches can be used, such as electrical, mechanical, optical, magnetic, etc. A mechanical switch can be beneficial for simplified operation, or an optical switch can be beneficial because it is relatively low maintenance and generally unaffected by water and/or detergents. The switch 36 can be a state-change switch that is utilized in a feedback loop of the appliance control circuitry to indicate whether the transmission shift structure 16 is positioned in an agitate cycle, or in a spin cycle, etc. Thus, rotation of the transmission selector arm 22 can cause the cam surface 40 to displace the first end 32 to thereby cause the pivot arm to move (i.e., rotate) about the pivot point 31 and activate the switch 36 with the second end 34 to provide an indication of which transmission state is currently active.

Figure 5:
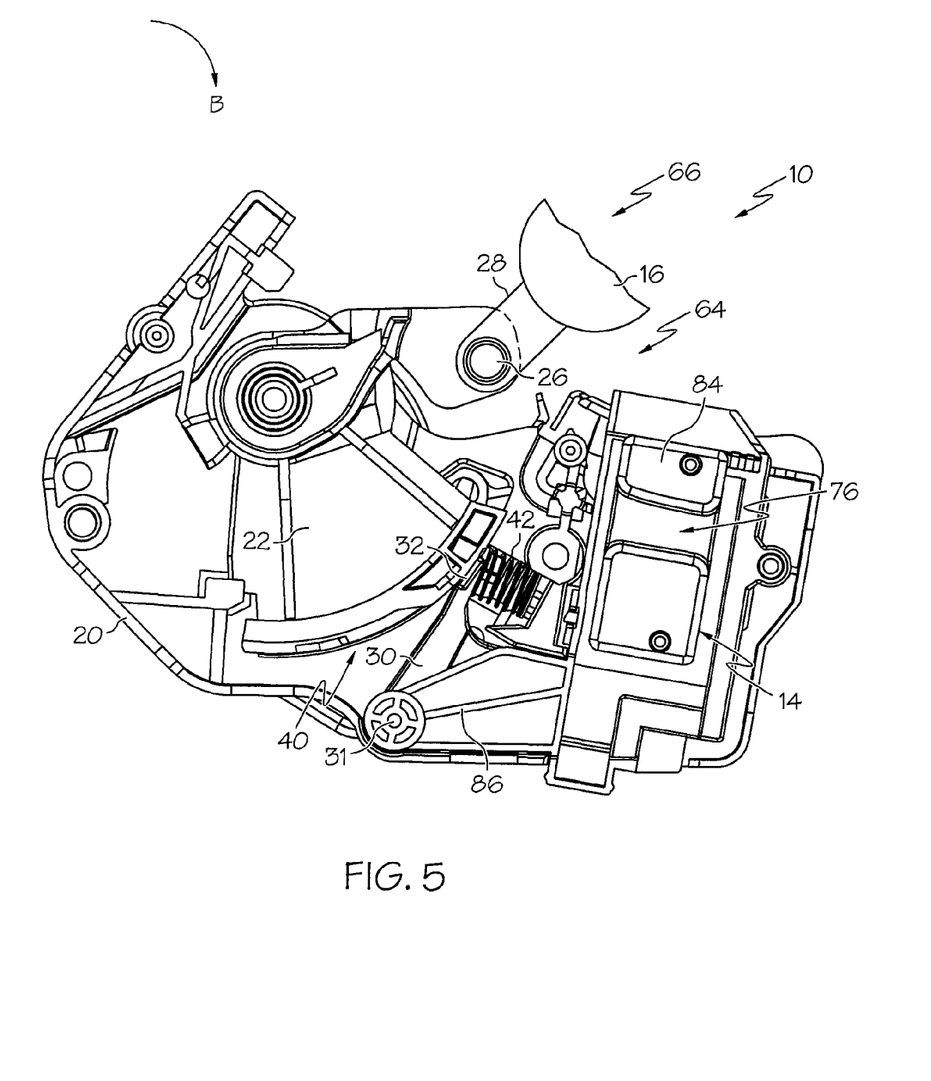
FIG. 5 is an illustration similar to FIG. 4, but with the transmission selector arm in a second position.
Figure 6:
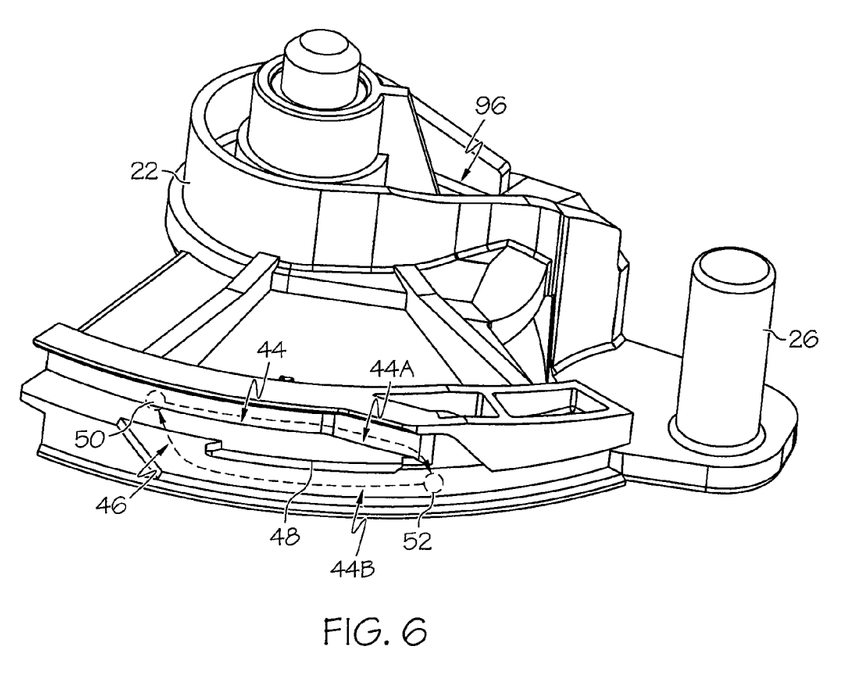
FIG. 6 illustrates a perspective view of the transmission selector arm.

Turning to FIGS. 4-6, the first end 32 of the pivot arm can ride upon the cam surface 40 to selectively move the second end 34 towards a switch engaging position. In one example, the cam surface 40 can include at least two independent lobes arranged along a single track, such as at least two lobes in a single plane. In another example, shown in FIG. 6, the cam surface 40 can include at least two lobes arranged along dual tracks. For example, the cam surface can include at least two independent travel lobes 44, 46 that may be separated by a wall 48 or the like, and that can be arranged variously, such as generally parallel or at an angle. First and second stop points 50, 52 can be located at predetermined positions of the independent travel lobes 44, 46, respectively, such as about an end or in the middle, etc.

As can be appreciated, at least a portion of the first independent travel lobe 44 can include a ramped structure for displacing (e.g., lifting) the first end 32 of the indicator element 30 to cause movement of the second end 34 (i.e., towards a switch engaging position). Similarly, at least a portion of the second independent travel lobe 46 can also include a displacing structure for, dropping the first end 32 of the indicator element 30 back towards the first stop point 50 to also cause movement of the second end 34 (i.e., switch disengaging). The first travel lobe 44 can have multiple portions 44A, 44B located on either side of the wall 48, and the cam surface 40 can include structure to arrange the first travel lobe 44 to have a generally U-shaped travel geometry. In combination, the first and second travel lobes 44, 46 can provide an oval-shaped travel geometry (shown in phantom).

Additionally, the two independent travel lobes 44, 46 can be arranged vertically separated from each other (e.g., such as by the wall 48) to provide a further benefit in that the indicator element 30 can be caused to also move in a vertical direction. For example, the indicator element 30 can be vertically slidable along the pivot point 31. Thus, the indicator element 30 can experience at least two degrees of freedom (i.e., horizontal movement and vertical movement). One advantage of this design is that a maximum travel ratio of the first travel lobe 44 relative to the second travel lobe 46 can be at least about 4:1, and more preferably 5:1 or greater. As a result, the control circuitry of the washing machine can be programmed to more clearly allocate the different signals provided by the switch 36 when the indicator element 30 is in the first and second stop points 50, 52. Additionally, the increased travel length of the first travel lobe 44 can provide that the switch 36 operates as a state-change switch that is only activated or deactivated once the indicator element 30 has finally reached one of the first or second stop points 50, 52 that correspond with the transmission shift structure actually being in the first state or second states 62, 66. Further, the increased travel length of the first travel lobe 44 can provide a neutral or delay position. It is understood that although one operation scheme is described regarding the cam surface 40 and switch 36, different variations thereof are contemplated.

Referring to FIG. 4, the transmission selector arm 22 is rotated along the direction of arrow A until it is located in the first position 60. The offset pin 26 moves the transmission shift structure 16 to the first state 62. Referring to FIG. 6, the first end 32 of the indicator element 30 is located generally about the first stop point 50 of the cam surface 40. The second end 34 of the indicator element 30 has not activated the switch 36 (i.e., disengaged from the switch 36, switch in a first condition, etc.).

Referring now to FIG. 5, the transmission selector arm 22 is rotated along the direction of arrow B until it is located in the second position 64. The offset pin 26 moves the transmission shift structure 16 to the second state 66. Referring back to FIG. 6, the first end 32 of the indicator element 30 travels along the first travel lobe 44 until it is located generally about the second stop point 52 of the cam surface 40. The second stop point 52 is located to correspond to the transmission shift structure 16 being in the second state 66. The second end 34 of the indicator element 30 is rotated about the pivot point 31 to activate the switch 36 (i.e., engaged with the switch 36, switch in a second condition, etc.).

Figure 7:
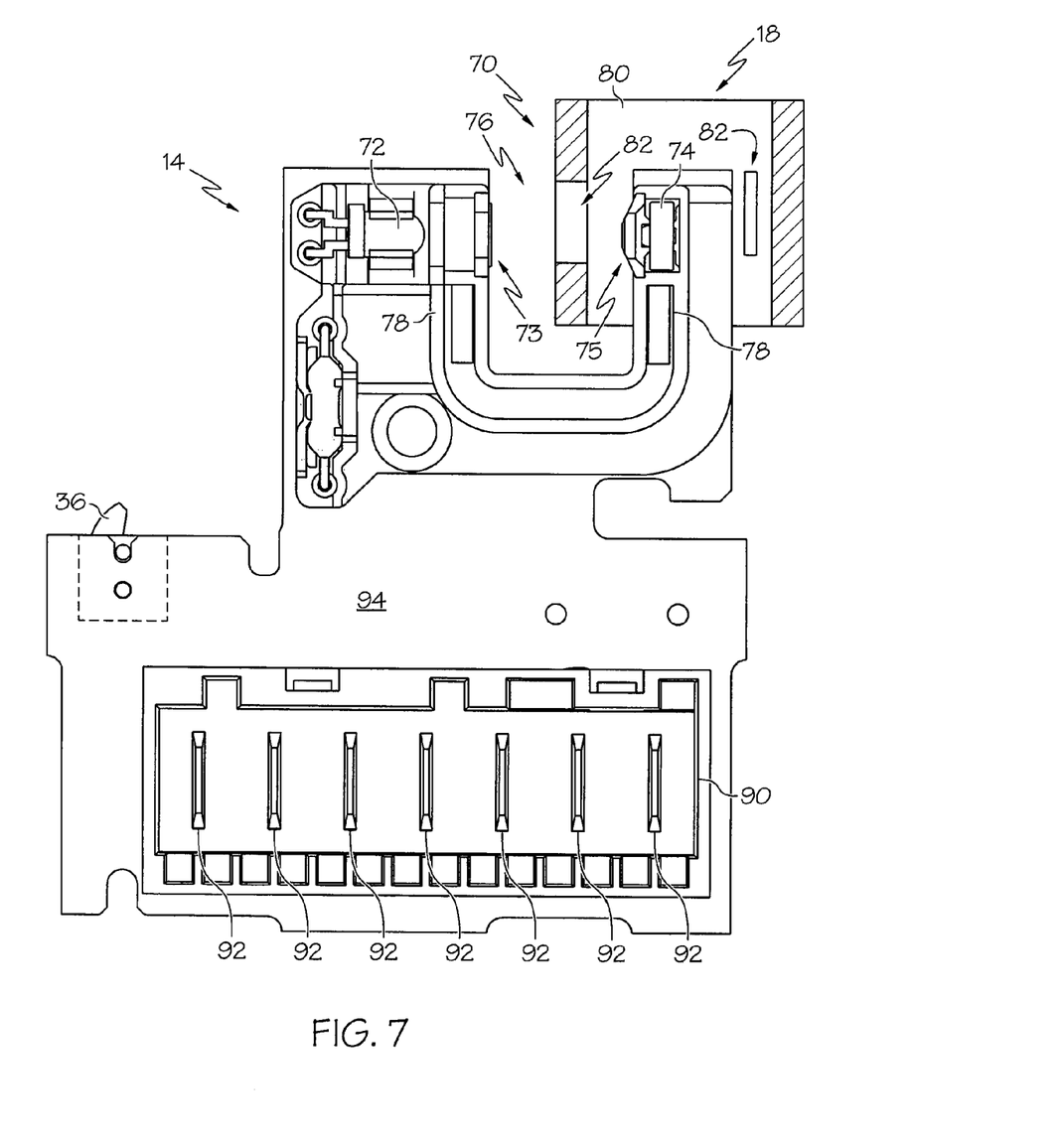
FIG. 7 illustrates a front view of an example electrical connector.

Referring now to FIGS. 3 and 7, the combination module can further include the speed sensor mechanism 14 adapted to sense the operative speed of a motive element 18 of the appliance. Herein, operation of the speed sensor mechanism 14 will be described with the appliance being a washing machine (not shown), the motive element 18 being a rotating wash basket (not shown), and the speed sensor mechanism 14 being adapted to sense the operative speed, such as the rotative speed, of the wash basket. Still, other appliances and operational schemes are contemplated.

The speed sensor mechanism 14 can directly or indirectly sense the rotative speed of the wash basket, and can provide analog and/or digital output information to the control circuitry of the appliance regarding the speed of the wash basket. The speed sensor mechanism 14 can include sensing structure 70 adapted to determine a rotational speed of the wash basket. The sensing structure 70 can be positioned variously about the combination module 10, and can include various types of sensors, such as optical, magnetic, conductive tracks, etc. In one example, the sensing structure can be similar to that described in U.S. Pat. No. 7,060,979, assigned to emz-Hanauer GmbH & Co. KgaA, which is part of this patent application and is incorporated herein by reference thereto.

In the shown example, the sensing structure 70 can be an optical type including at least one optical emitter 72 and at least one optical receiver 74, though various numbers of each can be utilized. Generally, the optical emitter 72 is located towards one side of a measurement zone 76, while the optical receiver is located towards another side of the measurement zone 76 and is positioned to sense a signal generated by the optical emitter 72. The optical emitter 72, e.g., in the form of a semiconductor element, is capable of emitting electromagnetic radiation through the measurement zone 76. The electromagnetic radiation can be light, such as infrared light, though the optical emitter 72 can be configured to emit different types of electromagnetic radiation that can differ in wavelength, intensity, etc. Thus, the optical emitter 72 is configured to emit electromagnetic radiation into the measurement zone 76, while the optical receiver 74 is configured to detect the electromagnetic radiation transmitted through the measurement zone 76.

The optical emitter 72 can be mounted in a holding element 78, which is designed so that the optical emitter 72 necessarily assumes a predetermined aligned position relative to the measurement zone 76 and/or optical receiver 74. Similarly, the optical receiver 74 can also be mounted to the holding element 78 (or other positioner), to also assume a predetermined aligned position relative to the measurement zone 76 and/or optical emitter 72. Where a single holding element 78 is used, it can have a generally U-shaped geometry that conforms around the measurement zone 76. Thus, the holding element 78 can establish a predetermined distance (and/or angle) between the optical emitter 72 and optical receiver 74. The optical emitter 72 and/or optical receiver 74 can be fixedly received by the holding element 78, such as snapped, glued, or welded into place during assembly to thereby simplify the assembly process while maintaining the positional relation of the sensing structure 70. The holding element 78 may also receive other electrical components for the transmission selector mechanism 12 and/or the speed sensor mechanism 14, and/or may even define the predetermined gap for receiving the motive element 18.

In addition or alternatively, either or both of the optical emitter 72 and optical receiver 74 can be provided with an aperture 73, 75 configured to constrain, direct, and/or otherwise control the electromagnetic radiation emitted by the optical emitter 72 to provide reliable and accurate measurement results, such as by reducing the influence of scattering effects, etc. Either or both of the apertures 73, 75 may be defined in a portion of the holding element 78. Due to these features, inexpensive standard components, i.e., diodes, transistors or the like, may be used for the optical emitter 72 and the optical receiver 74. Additionally, use of the holding element 78 can enable that these inexpensive components will be positioned more or less automatically within relatively narrow, position tolerances in the desired manner.

In one example operation, the sensing structure 70 can be adapted to directly or indirectly monitor the motive element 18 of the appliance via a sensor wheel 80 (schematically shown in FIG. 7), such as an encoder wheel or the like, that is rotationally driven directly or indirectly by rotation of the wash basket. In various examples, the sensor wheel 80 can be coupled directly to the wash basket to rotate together therewith, and/or coupled indirectly via gear train or the like. The sensor wheel 80 can be provided with a plurality of regularly spaced holes 82 or windows that can have various geometries, such as rectangular, circular, elliptical, polygonal, etc. In the case of rectangular holes 82, each of the holes 82 can have a predetermined length and width. The holes 82 can be located within the measurement zone 76 and between the optical emitter 72 and optical receiver 74.

As the sensor wheel 80 is rotationally driven by rotation of the wash basket, movement of the sensor wheel 80 within the measurement zone 76 can be sensed by the sensing structure 70 and converted into a rotational speed of the wash basket. As the sensor wheel 80 rotates relative to the sensing structure 70, the holes 82 will occasionally (e.g., periodically) allow the electromagnetic radiation to pass therethough for detection by the optical receiver 74 when one of the holes 32 is aligned between the optical emitter 72 and optical receiver 74. Similarly, the sensor wheel 80 will occasionally (e.g., periodically) disallow the electromagnetic radiation to pass therethough when one of the holes 32 is not aligned between the optical emitter 72 and optical receiver 74. The sensing structure 70 will sense the amount, timing, etc. of electromagnetic radiation received by the optical receiver 74 and provide an output signal to the control circuitry of the appliance regarding the speed of the wash basket. It is understood that the sensing structure 70 can output a raw data signal to be interpreted by the control circuitry, and/or can provide an actual calculated speed signal data to the control circuitry.

In addition or alternatively, a protective cover 84 (see FIG. 2) can be located over the speed sensor mechanism 14. The protective cover 84 can inhibit water, spray, and/or debris from interfering with the sensing structure 70. At least a portion of the protective cover 84 can be transmissive to the electromagnetic radiation (e.g., optically transmissive) for operation of the sensing structure 70. The protective cover may also cooperate with the holding element 78 to define the predetermined gap for receiving the sensor wheel 80. Further, the protective cover 84 can include a support arm 86 or the like that is coupled to the main body 20 for various reasons. In one example, the support arm 86 can be used to couple the indicator element 30 to the main body 20 about the pivot point 31. The support arm 86 can allow the indicator element 30 to rotate while also limiting the vertical movement thereof.

In addition or alternatively, the combination module 10 can further include at least one electrical connector for electrically coupling the transmission selector mechanism 12 and/or the speed sensor mechanism 14 to the control circuitry of the washing machine. In one example, a single electrical connector 90 (see FIG. 7) can be provided to electrically couple both of the transmission selector mechanism 12 and the speed sensor mechanism 14 to the control circuitry of the appliance. The electrical connector 90 can include a plurality of electrical contacts 92 for the various electrical components of the combination module 10, including contacts for power, control, data, etc. Still, it is to be understood that more than one electrical connector can be provided.

The electrical connector 90 can be operatively coupled directly or indirectly to the various electrical elements of the combination module 10, such as by wires and/or via a printed circuit board 94 (PCB). For example, one or more PCB's 94 can be provided that are coupled to the main body 20, having various analog and/or digital circuitry, integrated circuits, etc. As shown, a single PCB 94 can be provided that is coupled to the main body 20 for use with both of the transmission selector mechanism 12 and a speed sensor mechanism 14. For example, the sensing structure 70 can be mechanically and/or electrically coupled directly to the PCB 94, either directly or via the holding element 78. In another example, both of the speed sensor mechanism 14 and the single electrical connector 90 can be mechanically and/or electrically coupled to the PCB 94. In addition or alternatively, the switch 36 can also be mechanically and/or electrically coupled to the PCB 94. Thus, manufacturing can be simplified by first assembling the single PCB 94 with the sensing structure 70 and electrical connector 90, and then coupling the single, completed PCB 94 to the main body 20 as a drop-in part. The use of a single PCB 94 with a single electrical connector 90 can increase design robustness while providing cost savings.

In addition or alternatively, the combination module 10 can include various structures to provide water protection, such for use in a washing machine environment. In one example, various elements can include protective structure(s) 96 (see FIG. 2) to help keep spraying or dripping water or chemicals away from the combination module 10, such as away from the PCB 94 and/or electric motor 24. In various examples, the protective structure(s) 96 can deflect water or chemicals away from contact with the combination module 10, and/or may also channel collected water away from various portions of the combination module 10 and towards a desired drain. The main body 20, protective cover 84 and/or the transmission selector arm 22 may include such protective structure(s) 96, though it is understood that any of the various elements of the combination module 10 can include various types of protective structure(s) 96. In yet another example, portions of the combination module 10 can be provided with protective layers, coatings, or the like to protect against water damage. For example, the electric motor 24 can be provided with a Mylar coating or protective plate to inhibit water damage.

The combination module 10 can provide for various advantages over the prior art. One advantage of the present application provides that the both of the transmission selector mechanism 12 and a speed sensor mechanism 14 can be provided as a single unit that is assembled to the appliance without requiring any particular manual skill. Therefore, production may not require any increased care and can easily be automated. These measures thus lead to a combination module which can be manufactured relatively easily and inexpensively by mass production.

It is another advantage of the present application that a single part can replace two or more conventional parts while providing similar functionality.

It is another advantage of the present application that a single main body 20 can provide support for two or more conventional parts (i.e., the transmission selector mechanism 12 and the speed sensor mechanism 14), which can reduce physical space, weight, assembly time, cost, etc.

It is another advantage of the present application that a single part can provide a single electrical connector 90 for use with two mechanisms (i.e., the transmission selector mechanism 12 and the speed sensor mechanism 14).

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A combination module for an appliance, the combination module providing plural functions within the appliance, the combination module including:
    a rigid, unitary main body adapted to be coupled to a portion of the appliance;
    a transmission selector mechanism coupled to the main body with the main body supporting the transmission selector mechanism and adapted to selectively operate transmission shift structure of the appliance as a function within the appliance; and
    a speed sensor mechanism coupled to the main body with the main body supporting the speed sensor mechanism and adapted to sense the operative speed of a motive element of the appliance as a function within the appliance;
    the main body providing a single mounting system for both of the transmission selector mechanism and the speed sensor mechanism to the portion of the appliance.

2. The combination module of claim 1, wherein the transmission selector includes a transmission selector arm adapted to selectively operate transmission shift structure of the appliance between a first state and a second state.

3. The combination module of claim 2, further including an indicator element operatively driven by the transmission selector arm and adapted to indicate whether the transmission shift structure of the appliance is in the first state or the second state.

4. The combination module of claim 3, wherein the indicator element includes a pivot arm having a first end operatively driven by the transmission selector arm and a second end adapted to engage a switch based upon a position of the first end.

5. The combination module of claim 4, wherein the transmission selector arm includes a cam surface, and the first end of the pivot arm rides upon the cam surface to selectively move the second end towards a switch engaging position.

6. The combination module of claim 5, wherein the cam surface includes at least two independent travel lobes.

7. The combination module of claim 1, wherein the appliance is a washing machine and the motive element includes a rotating wash basket, and the speed sensor mechanism is adapted to sense the rotative speed of the wash basket.

8. The combination module of claim 1, wherein the speed sensor mechanism includes at least one optical emitter and at least one optical receiver.

9. The combination module of claim 8, further including a holding element adapted to fixedly receive said at least one optical emitter and said at least one optical receiver to establish a predetermined distance therebetween.

10. The combination module of claim 8, further includes an optically transmissive protective cover disposed over the speed sensor mechanism.

11. The combination module of claim 1, further including a single electrical connector adapted to electrically couple the transmission selector mechanism and the speed sensor mechanism to control circuitry of the appliance.

12. The combination module of claim 11, wherein the single electrical connector includes multiple electrical contacts and is secured to a printed circuit board that is coupled to the main body.

13. A combination module for an appliance, the combination module providing plural functions within the appliance, the combination module including:
   a rigid, unitary main body adapted to be coupled to a portion of the appliance;
   a transmission selector mechanism coupled to the main body with the main body supporting the transmission selector mechanism and adapted to selectively operate transmission shift structure of the appliance as a function within the appliance;
   a speed sensor mechanism coupled to the main body with the main body supporting the speed sensor mechanism and adapted to sense the operative speed of a rotating element of the appliance as a function within the appliance; and
   a single electrical connector coupled to the main body with the main body supporting the single electrical connector and the single electrical connector adapted to electrically couple the transmission selector mechanism and the speed sensor mechanism to control circuitry located elsewhere in of the appliance.

14. The combination module of claim 13, further including a printed circuit board, wherein both of the speed sensor mechanism and the single electrical connector are secured to the printed circuit board.

15. The combination module of claim 13, wherein the transmission selector includes a transmission selector arm adapted to selectively operate transmission shift structure of the appliance between a first state and a second state.

16. The combination module of claim 15, further including an indicator element operatively driven by a cam surface of the transmission selector arm and adapted to engage a switch based upon a position of the indicator element to indicate whether the transmission shift structure of the appliance is in the first state or the second state.

17. The combination module of claim 13, wherein the speed sensor mechanism includes at least one optical emitter and at least one optical receiver adapted to sense rotative speed of the rotating element of the appliance.

18. A combination module for an appliance, the combination module providing plural functions within the appliance, the combination module including:
   a rigid, unitary main body adapted to be coupled to a portion of the appliance;
   a transmission selector mechanism coupled to the main body with the main body supporting the transmission selector mechanism, the transmission selector mechanism including a transmission selector arm adapted to selectively operate transmission shift structure of the appliance between a first state and a second state as a function within the appliance;
   an indicator element operatively driven by the transmission selector arm and adapted to indicate whether the transmission shift structure of the appliance is in the first state or the second state; and
   a speed sensor mechanism with the main body supporting the speed sensor mechanism and adapted to sense the operative speed of a motive element of the appliance as a function within the appliance;
   the main body providing a single mounting system for both of the transmission selector mechanism and the speed sensor mechanism to the portion of the appliance.

19. The combination module of claim 18, wherein the indicator element includes a pivot arm having a first end operatively driven by a cam surface of the transmission selector arm and a second end adapted to engage a switch based upon a position of the first end.

20. The combination module of claim 18, wherein the speed sensor mechanism includes at least one optical emitter and at least one optical receiver adapted to sense rotative speed of the motive element of the appliance.

21. The combination module of claim 18, further including a single electrical connector adapted to electrically couple the transmission selector mechanism and the speed sensor mechanism to control circuitry of the appliance.

* * * * *